United States Patent
Lee et al.

(10) Patent No.: US 10,182,200 B2
(45) Date of Patent: Jan. 15, 2019

(54) HIGH ACCURACY DISPLACEMENT DETECTION SYSTEM WITH OFFSET PIXEL ARRAY

(71) Applicant: PixArt Imaging (Penang) SDN. BHD., Penang (MY)

(72) Inventors: Sai Mun Lee, Penang (MY); Wui Pin Lee, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 20 days.

(21) Appl. No.: 15/146,901

(22) Filed: May 5, 2016

(65) Prior Publication Data

US 2017/0324919 A1 Nov. 9, 2017

(51) Int. Cl.
*H04N 5/369* (2011.01)
*H04N 5/14* (2006.01)

(52) U.S. Cl.
CPC ........... *H04N 5/3696* (2013.01); *H04N 5/145* (2013.01)

(58) Field of Classification Search
CPC .................................................. H04N 5/3696
USPC .................................................... 348/208.99
See application file for complete search history.

(56) References Cited

U.S. PATENT DOCUMENTS

| | | | |
|---|---|---|---|
| 2002/0158978 A1* | 10/2002 | Gann | H04N 1/486 348/272 |
| 2006/0146163 A1* | 7/2006 | Uemura | H04N 9/045 348/311 |
| 2007/0057190 A1* | 3/2007 | Hatanaka | H04N 5/32 250/370.09 |

* cited by examiner

*Primary Examiner* — Joel W Fosselman
(74) *Attorney, Agent, or Firm* — Winston Hsu

(57) ABSTRACT

A pixel array system for high accuracy detection of displacement, speed and acceleration includes: an array comprising m columns and n rows, wherein at least every other row is offset with respect to a preceding row of the array. In a first embodiment, every other row is offset with respect to a preceding row of the array by 25% of a pixel width. In a second embodiment, every two rows are offset with respect to a preceding two rows of the array by 25% of a pixel width.

6 Claims, 6 Drawing Sheets

HIGH ACCURACY DISPLACEMENT DETECTION SYSTEM WITH OFFSET PIXEL ARRAY

BACKGROUND OF THE INVENTION

1. Field of the Invention

This invention relates to pixel arrays for object detection, and more particularly, to designing a pixel array with offset rows in order to create a high accuracy displacement detection system.

2. Description of the Prior Art

Optical sensors detect the motion of an object via a pixel array, consisting of an m×n matrix. An example pixel array 100 is shown in FIG. 1. The pixel array consists of 8 rows by 8 columns. This is merely for illustrative purposes. The actual array coverage is determined by the size of the pixels themselves; for example, if the pixel array were 20×20 and the pixel size were 30 μm, the total array coverage would be 600 μm×600 μm.

In order to detect motion of an object, said object needs to cross at least one pixel boundary in the horizontal or vertical direction. With a smaller pixel size, for example 10 μm, accuracy can be increased and high detection and resolution can be obtained. This decrease in pixel size, however, means the total array coverage will also be decreased. This leads to limitations in the speed of an object which can be detected, as well as the total feature size of the object.

One method for retaining high resolution as well as the size of the effective area is simply to increase the size of the array; for example, having an array consisting of 60 rows× 60 columns. This results in increased complexity of the sensor, however, and requires higher amounts of power to be drawn from the system for operation. The circuitry involved will not only need to be larger, but will also be more expensive.

There is therefore a tradeoff in resolution vs. effective size.

SUMMARY OF THE INVENTION

A pixel array system for high accuracy detection of displacement, speed and acceleration according to an exemplary embodiment of the present invention comprises: an array comprising a plurality of pixels, wherein at least one column or row is offset with respect to a preceding column or row of the array. In a first embodiment, every row is offset with respect to a preceding row of the array by 25% of a pixel width. In a second embodiment, every two rows are aligned with respect to each other, and every two rows are offset with respect to a preceding two rows of the array by 25% of a pixel width.

These and other objectives of the present invention will no doubt become obvious to those of ordinary skill in the art after reading the following detailed description of the preferred embodiment that is illustrated in the various figures and drawings.

DETAILED DESCRIPTION

The present invention outlines a new pixel array which can effectively retain higher resolution while maintaining larger array coverage.

Figure 2A:
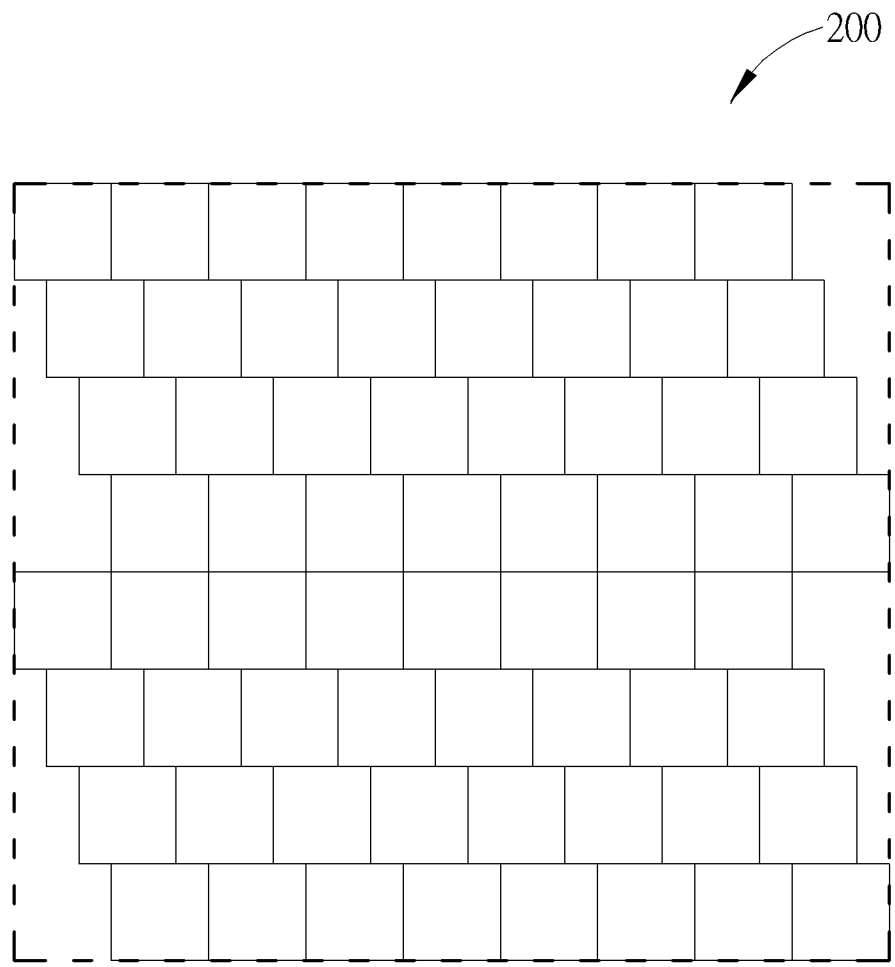
FIG. 2A is a diagram of offset pixel array according to a first embodiment of the invention.
Figure 2B:
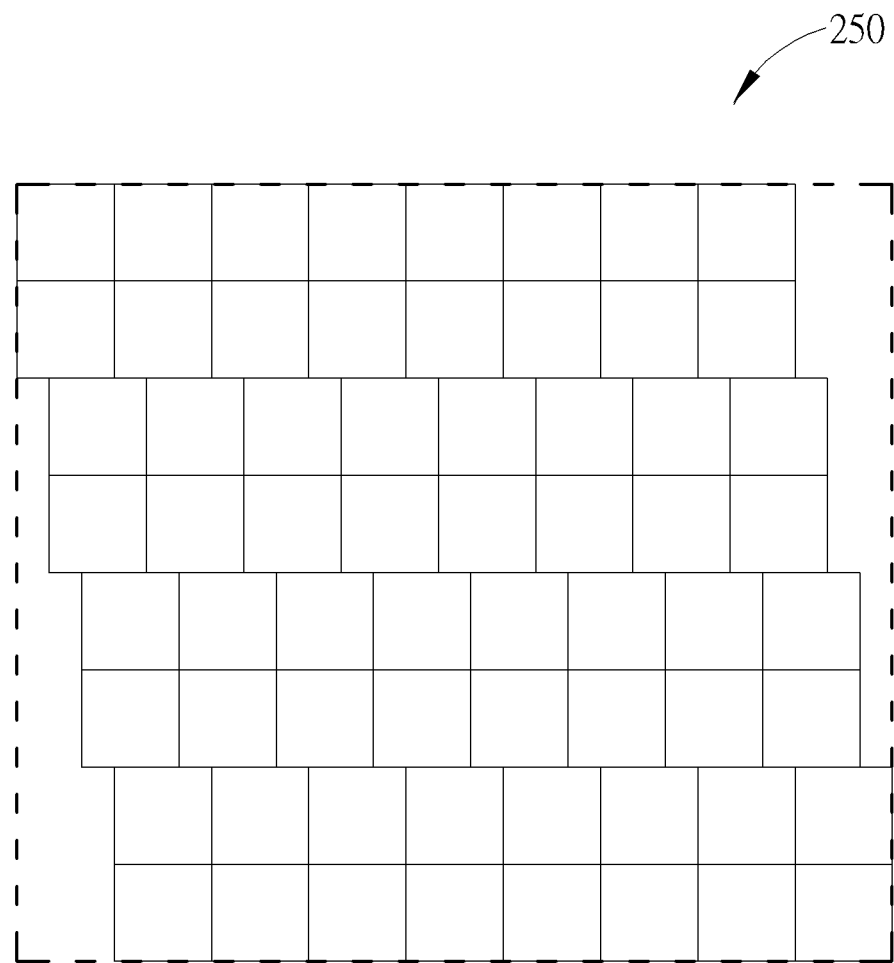
FIG. 2B is a diagram of offset pixel array according to a second embodiment of the invention.

The present invention provides a pixel array wherein the rows are offset with respect to each other. Two different embodiments of the array are shown in FIG. 2A and FIG. 2B, respectively. In the example array 200 shown in FIG. 2A, each pixel row is offset by 25% with respect to a following row. The pixel array is shown as having 8 rows×8 columns for simplicity. In the illustrated array, the first and fifth rows are aligned, the second and sixth rows are aligned, the third and seventh rows are aligned, and the fourth and eight rows are aligned. A description of each row and its offset with respect to the first row is detailed in the following:

$1^{st}$ row: 0
$2^{nd}$ row: offset −25%
$3^{rd}$ row: offset −50%
$4^{th}$ row: offset −75%
$5^{th}$ row: 0
$6^{th}$ row: offset −25%
$7^{th}$ row: offset −50%
$8^{th}$ row: offset −75%

In the example array 250 shown in FIG. 2B, every 2 rows are aligned with each other, and offset 25% with respect to the preceding 2 rows. A description of each row and its offset with respect to the first 2 rows is detailed in the following:

$1^{st}$ and $2^{nd}$ row: 0
$3^{rd}$ and $4^{th}$ row: −25%
$5^{th}$ and $6^{th}$ row: −50%
$7^{th}$ and $8^{th}$ row: −75%

Figure 1:
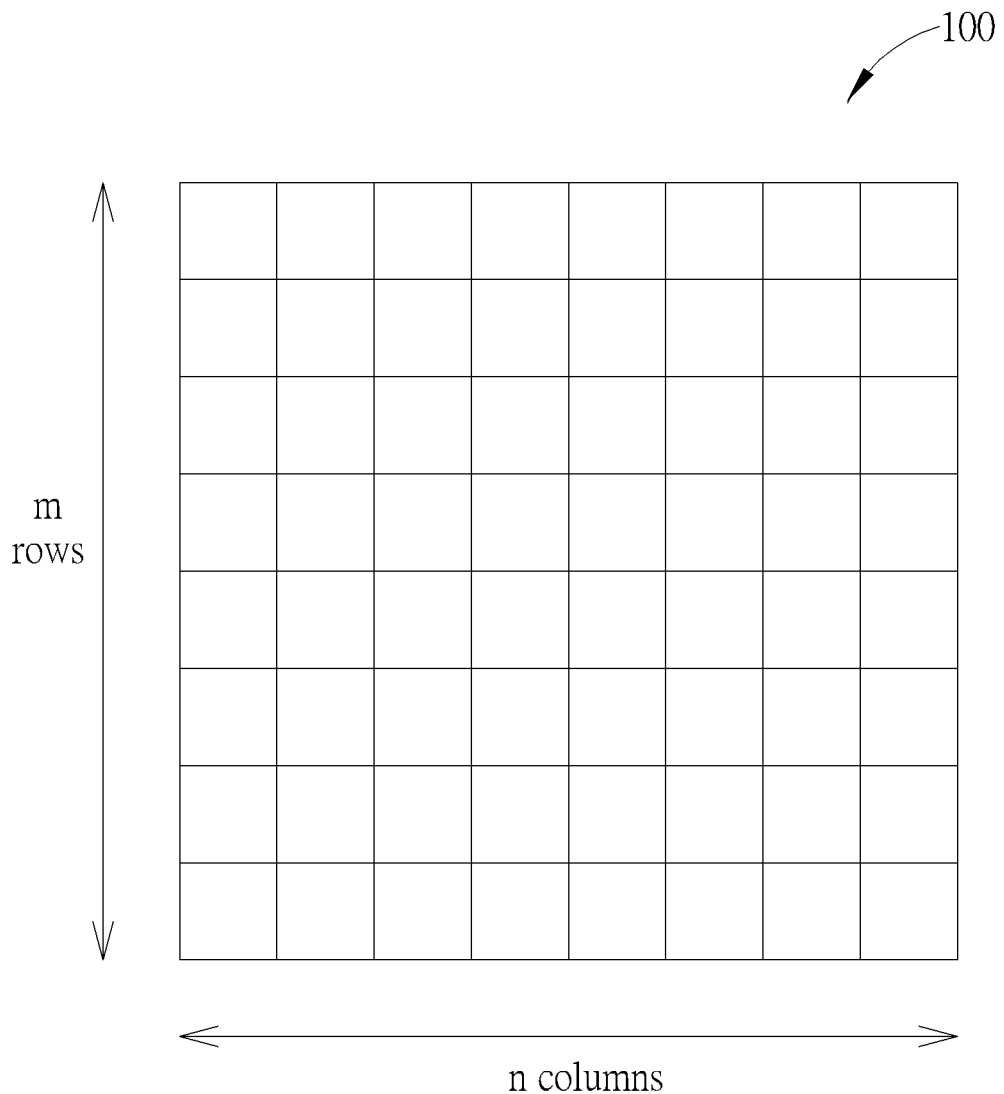
FIG. 1 is a diagram of a standard pixel array

In both diagrams, a dotted line has been drawn around the boundary of the pixel array. This dotted line represents the entire area occupied by the pixel array. Note this is not the effective area, as some parts are not occupied by all pixels. The entire area is increased slightly with respect to the original pixel array 100 shown in FIG. 1, but the effective area is the same as if the pixel size were only 10 μm.

It should be noted that the size of the array and the offset illustrated are merely provided as examples of the technique of the invention and are not meant in a limiting sense. The offset is limited by the size of the array, however. For example, if the array only has 4 rows, the minimum offset would be 25%, whereas if the array has 10 rows, the minimum offset can be 10%. A designer can effectively choose an array and offset size according to various considerations. If the feature size of an object to be tracked is large, it is reasonable to have a larger array size.

It should also be noted that, although the array is shown having offset rows, the array can also be designed to have offset columns. In this case, the array is more suited for tracking vertical motion (motion in the y axis).

As a pixel array is usually designed to be of a fixed size, the offset can be arranged during post-processing. Further, the increased resolution array also has increased resolution with respect to determining velocity and acceleration of an object.

Figure 3A:
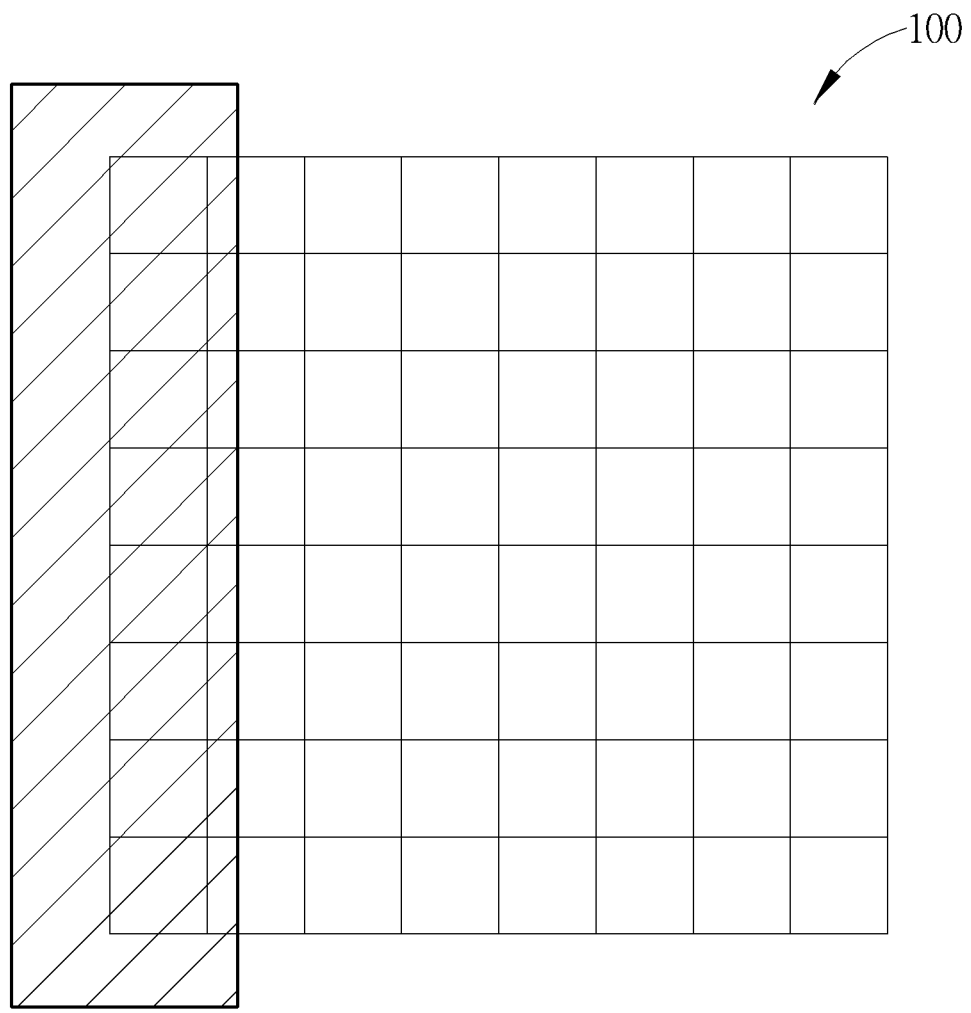
FIG. 3A is a diagram illustrating object detection of the pixel array shown in FIG. 1.
Figure 3B:
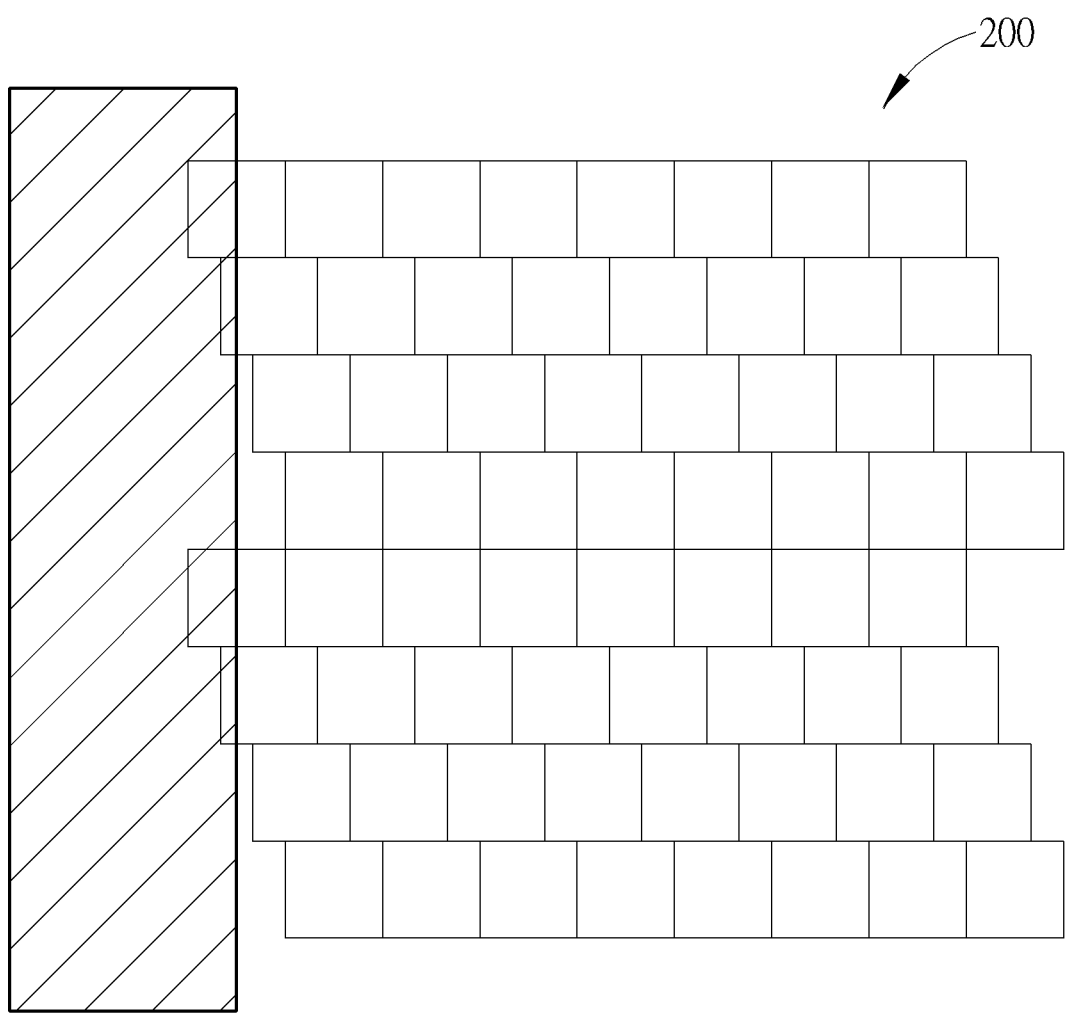
FIG. 3B is a diagram illustrating object detection of the pixel array shown in FIG. 2A.
Figure 3C:
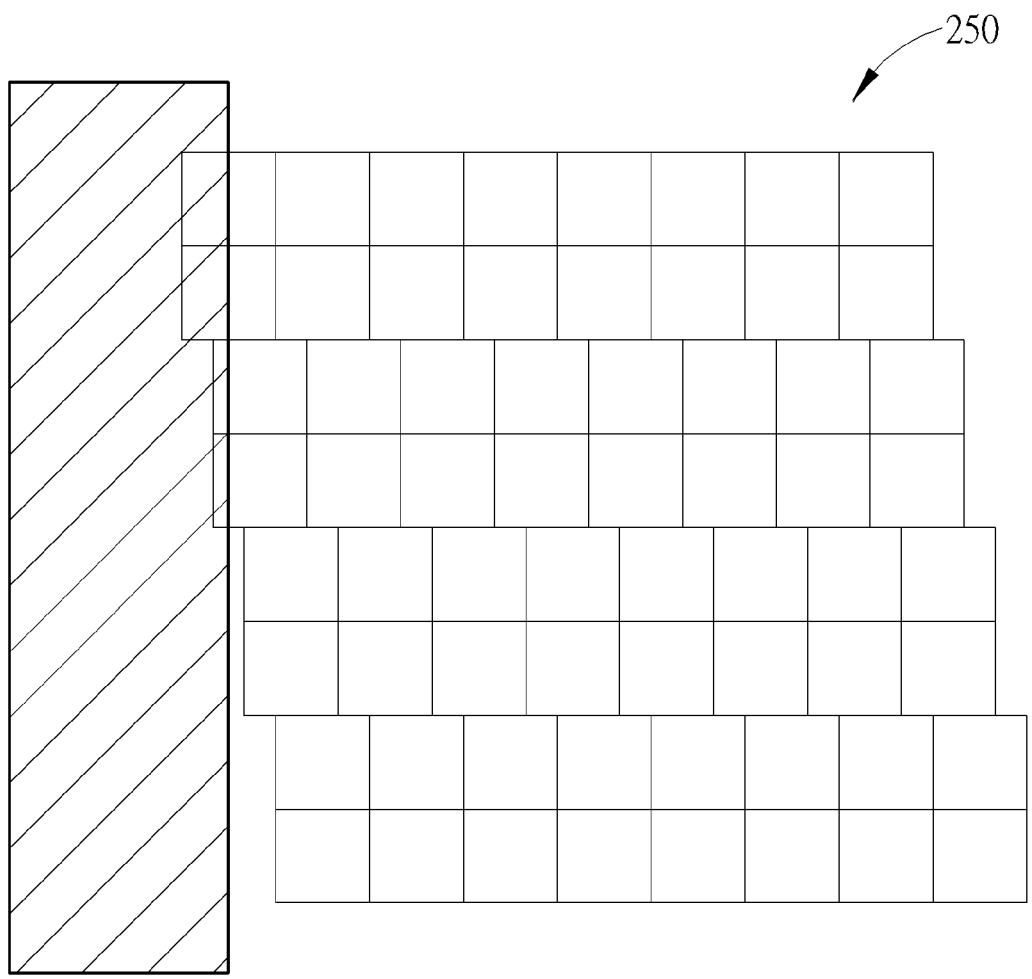
FIG. 3C is a diagram illustrating object detection of the pixel array shown in FIG. 2B.

FIG. 3A illustrates a standard size object passing over the pixel array 100. FIG. 3B illustrates a standard size object passing over the pixel array 200 shown in FIG. 2A. FIG. 3C illustrates a standard size object passing over the pixel array 250 shown in FIG. 2B. As shown by the three diagrams, the object needs to pass an entire column before any horizontal motion is detected. In the pixel arrays shown in FIG. 3B and FIG. 3C, the same size object only needs to pass just over 25% of a pixel column before the horizontal motion is detected. Although the pixel size is unchanged, the resolution has increased by almost 400%.

As detailed above, this offset pixel array can increase the resolution when capturing horizontal motion. For vertical motion, the resolution will not be improved but, as objects to be tracked are usually longer than the array, this will not affect the overall effectiveness of the array.

As pixel size does not need to be reduced while the resolution is increased significantly, array coverage can be maintained while accuracy of detection is increased. Accuracy of detection of speed and acceleration is also increased, but power resources are saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel array system for high accuracy detection of displacement, speed and acceleration, comprising:
an array comprising a plurality of pixels, each pixel touching at least one other pixel in a same row and touching at least one other pixel in a different row, wherein at least one row is offset with respect to a preceding row of the array by less than 50% of a pixel width, the array for receiving an input from an object passing over at least the offset row and the preceding row, and detecting displacement, speed and acceleration of the object when said object passes less than 50% of a column of the array, in order to generate an output representing at least one of the detected displacement, speed and acceleration of the object.

2. The pixel array system of claim 1, wherein at least every other row is offset with respect to a preceding row of the array.

3. The pixel array system of claim 2, wherein every row is offset with respect to a preceding row of the array.

4. The pixel array system of claim 3, wherein every row is offset with respect to a preceding row of the array by 25% of a pixel width.

5. The pixel array system of claim 2, wherein every two rows are aligned with respect to each other, and every two rows are offset with respect to a preceding two rows of the array.

6. The pixel array system of claim 5, wherein every two rows are offset with respect to a preceding two rows of the array by 25% of a pixel width.

* * * * *